June 29, 1948.  P. PEVNEY  2,444,113
FLUID TIGHT SEAL FOR FLEXIBLE MEMBERS
Filed Nov. 24, 1943
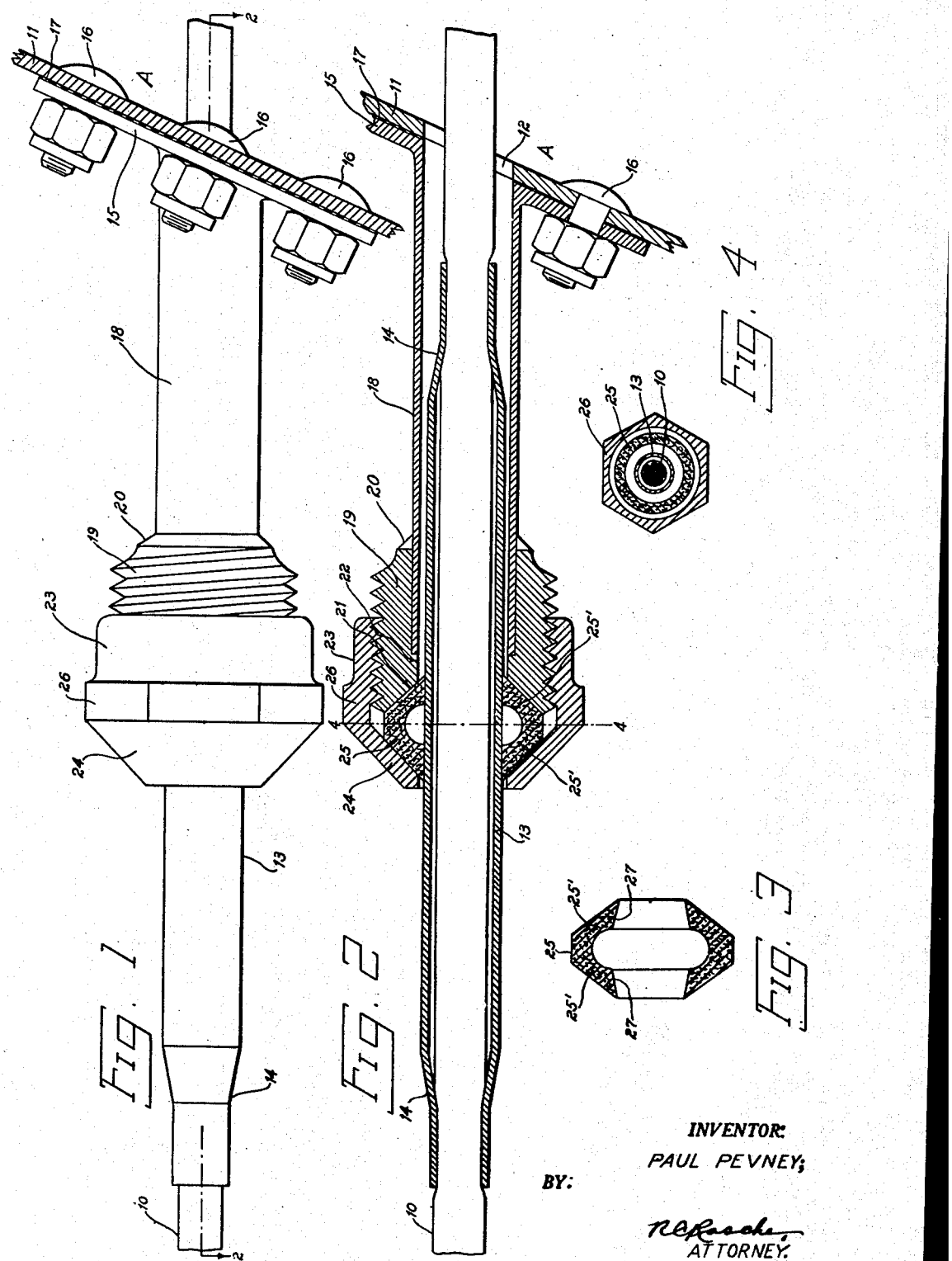
INVENTOR:
PAUL PEVNEY;
BY:
R. C. Rasche
ATTORNEY.

Patented June 29, 1948

2,444,113

UNITED STATES PATENT OFFICE 2,444,113

FLUIDTIGHT SEAL FOR FLEXIBLE MEMBERS

Paul Pevney, Massapequa, N. Y., assignor to Republic Aviation Corporation, a corporation of Delaware Application November 24, 1943, Serial No. 511,542

2 Claims. (Cl. 286—16)

This invention relates to seals generally for the prevention of air or fluid leakage between any stationary part and a coacting movable part, and specifically is designed to prevent the escape of air through an opening in the wall of an enclosure such for instance as the wall of the cabin of an aircraft through which an airfoil control or other movable elements may pass.

The instant invention is essentially designed for use in aircraft, and especially high altitude aircraft where the cabin is pressurized to maintain the internal pressure at the equivalent of the normal atmospheric pressure at a predetermined altitude, such for example as the normal atmospheric pressure at ten thousand feet, regardless of the actual altitude attained by the aircraft. Therefore at altitudes higher than the predetermined cabin pressure the pressure externally of the aircraft cabin is lower than that within the cabin, with the result that any openings in the walls defining the cabin constitute potential leaks for the internal cabin pressure and will vitiate the cabin pressure or make its maintenance difficult if not impossible. The controls of the various airfoils are, of course, movable and usually consist of push-pull rods or cables, which, to reach the airfoils to be controlled, must of necessity pass through the walls or bulkheads surrounding or defining the high pressure or pressurized cabin.

The present invention contemplates a seal to prevent the escape of pressure through openings provided in the walls, panels or bulkheads defining an aircraft cabin for the passage of the controls of the airfoils and particularly is designed for coaction with a flexible control such, for instance, as the cable for the control of the rudder.

In so sealing the opening through which the cable passes the operation of the cable in the performance of its normal functions is not interfered with and yet the opening is substantially air-tight regardless of the position of the cable or the airfoil controlled thereby.

With the above and other objects in view, as will be apparent, the invention consists in the construction, combination and arrangement of parts, all as hereinafter more fully described, claimed and illustrated in the accompanying drawings, wherein:

Fig. 1 is an elevation of the present seal, the wall or bulkhead defining an aircraft cabin and cooperating with the seal being fragmentarily shown in section;

Fig. 2 is a longitudinal section taken along line 2—2 of Fig. 1;

Fig. 3 is a section through the sealing member to the same scale as Figs. 1 and 2; and Fig. 4 is a transverse vertical section taken along line 4—4 of Fig. 2 to a somewhat reduced scale.

Reference being had more particularly to the drawings, 10 designates a flexible control cable for an airfoil (not shown) of an aircraft, such as the rudder, extending through the bulkhead or wall 11 defining the cabin or cockpit. On one side of the wall or bulkhead 11 is the cabin or cockpit A where the pressure upon the wall or bulkhead 11, at high altitudes, is greater than the pressure on the opposite or exterior side thereof. The cable 10 passes through an aperture 12 in the bulkhead or wall 11 to reach and regulate the airfoil with which it cooperates.

The cable 10 is surrounded by a sealing tube 13 on the low pressure side of the wall or bulkhead 11, which tube extends along the cable a sufficient distance to compensate for the reciprocal movements of the cable through the opening 12 in controlling the airfoil, but not for a distance that would interfere appreciably with the flexibility of the cable. At its ends the tube 13 is swaged, as at 14, to closely embrace the cable 10, so that the tube at its ends becomes, in effect, an integral part of the cable and moves as a whole or as a unit with the cable 10 as it reciprocates through the opening 12. In order to prevent air leakage between the reduced or swaged ends 14 of the tube and the cable 10 or between the strands of the cable where they pass through such reduced or swaged ends of the tube, a cement or plastic may surround the cable between it and the reduced ends of the tube, if it is considered that this precaution is necessary or desirable. In practice, however, it has been found that the pressure or swaging action between the ends of the tube and the cable is sufficient to prevent any appreciable air passage or leakage between the tube 13 and the cable 10 or between the strands of the cable.

A bracket plate 15 is secured to the wall or bulkhead 11 by the bolts or other fastening means 16 and surrounds the opening 12 in the wall or bulkhead 11. A rubber gasket or sealing ring 17 is interposed between the bracket plate 15 and the bulkhead or wall 11 and is placed under pressure by the bolts 16 thereby overcoming any tendency of the air pressure within the cockpit or cabin A to leak through the joint between the plate 15 and the outer surface of the bulkhead or wall 11.

A stationary tube 18 is secured to the plate 15, by welding or otherwise, so that it becomes for all intents and purposes an integral part of the plate, with its axis corresponding to and coinciding with the longitudinal axis of the sealing tube 13 and of the cable 10. On its outer end a threaded boss 19 is fixed, as at 20, to the tube 18 in any suitable manner, indicated in the drawings as being soldered, though of course welding, riveting or other means may be employed. The outer end of this boss is provided with an inwardly sloping seat 21 which extends inwardly from the outer extremity of the boss and terminates at the bore 22 through the boss 19 which registers with and forms a continuation of the passage of the tube 18.

An interiorly threaded sleeve 23 is threaded upon the boss and at its outer end has a holding and compression lip 24. This lip 24 extends outwardly and downwardly from the extremity of the sleeve 23 so that it is angularly disposed with reference to the seat 21, thereby being positioned to grip the sealing member 25 between it and the seat 21 of the boss 19. A faced shoulder 26 is formed integrally with the sleeve 23 adjacent to the angularly disposed compression lip 24. This shoulder 26 may be engaged by a wrench for the purpose of threading the sleeve upon the boss 19 thus not only determining its position on the boss but regulating the pressure applied by the lip 24 upon the sealing member 25.

The sealing member 25 is generally U-shaped in diametrical cross-section and its arms 25' are spaced one from the other with their inner edges 27 sloping downwardly and outwardly in opposite directions towards the substantial central axis of the sealing member so that normally the inner edges 27 of the arms 25' thereof are beveled outwardly towards its side faces. This sealing member 25 is made of felt or other suitable material that will not adhere to the tube 13 upon its reciprocation through the sealing member. The sealing member 25 is positioned between the compression lip 24 of the sleeve 23 and the seat 21 of the boss 19 whereby the threading of the sleeve 23 upon the boss 19 tends to compress the arms 25' of the sealing member towards one another bringing the edges 27 of the gasket arms into close and intimate contact with the exterior surface of the tube 14.

From the foregoing it is manifest that the tube 13 and the cable 10 to which it is attached will reciprocate within the tube 18, the boss 19 and the sleeve 23 under the influence of the cable as it is moved to control the airfoil it governs and that during this movement the sealing member 25 effectively prevents the passage of any air between the tubes 18 and 13, while the tube 18 also prevents any direct air passage through the opening 12. The high pressure within the cabin or cockpit A is to be found within the fixed or stationary tube 18 up to the sealing member 25, but leakage thereof at the joint between the edges 27 of the arms 25' of the sealing member 25 and the tube 13 is completely overcome by the sealing member itself.

While the present invention has been described as being particularly designed for use in connection with the pressurized cabin of an aircraft and for especial use in conjunction with a flexible airfoil control member, this is merely one of its uses for it obviously can be used to advantage wherever either rigid or flexible members operate through the wall of any enclosure which is isolated or insulated from the surrounding atmosphere for any purpose. An example of such a use would be an air conditioned or temperature controlled enclosure through the walls of which members reciprocate, the present device being employed to seal the openings through which said members pass.

What is claimed:

1. The combination with the wall of a pressure compartment of an aircraft, said wall having an opening therein and a flexible cable reciprocable through said opening, of a fluid-tight seal coacting with said flexible cable and said opening to prevent air under pressure from escaping through said opening from the compartment comprising: a stationary tube sealingly fixed to and projecting from the wall and circumscribing the opening therein, a movable tube at all times telescoped with the outer extremity of the stationary tube and fixedly and sealingly swaged to and surrounding said flexible cable to rigidify that portion thereof coextensive with and surrounded by said movable tube, a first member carried by and projecting beyond the outer end of said stationary tube having a primary seat at its projecting end, a sealing member encasing the movable tube and resting against said primary seat, and a second member adjustably secured to the first member carried by the stationary tube and having a complementary seat to cooperate with the primary seat to mount and retain the sealing member stationary and in engagement with the movable tube during its reciprocation and determine the compression of said member.

2. The combination with the wall of a pressure compartment of an aircraft, said wall having an opening therein and a cable reciprocable through said opening, of a fluid-tight seal coacting with said cable and said opening to prevent air under pressure from escaping through said opening from the compartment comprising: a stationary tube sealingly fixed to and projecting from the wall and circumscribing the opening therein, a movable tube at all times telescoped with one extremity of the stationary tube and surrounding and fixedly and sealingly swaged to said cable to rigidify that portion thereof coextensive with said movable tube, a collar encircling and secured to the extremity of the stationary tube and projecting beyond the terminal thereof, an inwardly sloping seat formed on the projecting end of said collar, a sleeve adjustably attached to said collar and having an outwardly sloping compression seat complementing the seat on the collar aforesaid, and a double lipped sealing member interposed between said seats to constantly embrace and bear on the movable tube as the latter reciprocates in and through the stationary tube.

PAUL PEVNEY.

REFERENCES CITED

The following references are of record in the file of this patent:

UNITED STATES PATENTS

| Number | Name | Date |
|---|---|---|
| 275,193 | Grannan | Apr. 3, 1883 |
| 350,116 | Chapman | Oct. 5, 1886 |
| 546,732 | Desserich | Sept. 24, 1895 |
| 1,623,403 | Friel | Apr. 5, 1927 |
| 1,796,303 | Rasmussen | Mar. 17, 1931 |
| 1,799,246 | Recker | Apr. 7, 1931 |
| 1,182,294 | Miller | May 9, 1916 |
| 1,868,064 | Horn | July 19, 1932 |
| 1,983,368 | Hathorn | Dec. 4, 1934 |
| 2,048,320 | Bennett | July 21, 1936 |
| 2,413,671 | Wolf et al. | Dec. 31, 1946 |

FOREIGN PATENTS

| Number | Country | Date |
|---|---|---|
| 739,996 | France | 1932 |